United States Patent
Xin et al.

(10) Patent No.: US 11,777,640 B2
(45) Date of Patent: Oct. 3, 2023

(54) METHOD AND APPARATUS FOR DUMMY SEQUENCE INSERTION IN DATA MODULATION

(71) Applicant: ZTE CORPORATION, Guangdong (CN)

(72) Inventors: Yu Xin, Shenzhen (CN); Jun Xu, Shenzhen (CN); Tong Bao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 43 days.

(21) Appl. No.: 17/529,843

(22) Filed: Nov. 18, 2021

(65) Prior Publication Data
US 2022/0077954 A1    Mar. 10, 2022

Related U.S. Application Data

(63) Continuation of application No. PCT/CN2019/087931, filed on May 22, 2019.

(51) Int. Cl.
*H04L 1/00* (2006.01)
*H04J 13/00* (2011.01)
(Continued)

(52) U.S. Cl.
CPC ........ *H04L 1/0008* (2013.01); *H04J 13/0062* (2013.01); *H04L 1/1642* (2013.01); *H04L 27/2634* (2013.01)

(58) Field of Classification Search
CPC . H04L 1/0008; H04L 1/1642; H04L 27/2634; H04L 27/2605; H04L 27/2646;
(Continued)

(56) References Cited

U.S. PATENT DOCUMENTS

| 7,496,028 B2 | 2/2009 | Jung et al. |
| 2004/0136314 A1* | 7/2004 | Jung ................ H04L 27/2618 370/478 |
| 2015/0312037 A1 | 10/2015 | Newman |

FOREIGN PATENT DOCUMENTS

| CN | 101136897 A | 3/2008 |
| CN | 102957635 A | 3/2013 |

(Continued)

OTHER PUBLICATIONS

Extended European Search Report for EP Appl. No. 19929608.8, dated Apr. 4, 2022 (8 pages).

(Continued)

*Primary Examiner* — Dady Chery
(74) *Attorney, Agent, or Firm* — Foley & Lardner LLP

(57) ABSTRACT

A method and apparatus for inserting dummy sequences during data modulation in a communication system, according to channel status, link status, and the like, is disclosed. In one embodiment, a method for data modulation by a wireless communication node of a wireless communication system, includes: inserting at least one first dummy sequence to a first data sequence in a first data block; and inserting at least one second dummy sequence to a second data sequence in a second data block; wherein a first length of a first dummy sequence is different from a second length of a second dummy sequence, and wherein the second dummy sequence includes the first dummy sequence or is included in the first dummy sequence.

15 Claims, 9 Drawing Sheets

(51) Int. Cl.
*H04L 1/1607* (2023.01)
*H04L 27/26* (2006.01)

(58) Field of Classification Search
CPC .............. H04L 27/2636; H04L 1/0026; H04L 27/2614; H04L 27/2618; H04J 13/0062; H04J 11/00
See application file for complete search history.

(56) References Cited

FOREIGN PATENT DOCUMENTS

| | | |
|---|---|---|
| CN | 107113155 A | 8/2017 |
| CN | 107462901 A | 12/2017 |

OTHER PUBLICATIONS

Hong Li et al., "Generalized Zero-Padding Scheme for Direct GPS P-code Acquisition" IEEE Transactions on Wireless Communications, Jun. 1, 2009, 8(6):2866-2871 (6 pages).
International Search Report and Written Opinion for PCT Appl. No. PCT/CN2019/087931, dated Dec. 27, 2019 (7 pages).

\* cited by examiner

METHOD AND APPARATUS FOR DUMMY SEQUENCE INSERTION IN DATA MODULATION

CROSS-REFERENCE TO RELATED APPLICATION

This application claims the benefit of priority under 35 U.S.C. § 120 as a continuation of PCT Patent Application No. PCT/CN2019/087931, filed on May 22, 2019, the disclosure of which is incorporated herein by reference in its entirety.

TECHNICAL FIELD

This disclosure relates generally to wireless communications and, more particularly, to a method and apparatus for inserting dummy sequences during data modulation in a communication system, according to channel status, link status, and the like.

BACKGROUND

4G LTE (Fourth Generation Long Term Evolution) adopts Orthogonal Frequency Division Multiplexing (OFDM) technology, and resources in the time-frequency domain composed of subcarriers and OFDM symbols form a wireless resource of the LTE system in the time-frequency domain. Cyclic Prefix (CP) is used in OFDM to resist multipath delay. However, since CP does not carry any useful data, addition of the CP increases the wireless resource overhead. This resource overhead problem caused by the CP become more sever, especially when the frequency band operates in a high frequency range, e.g., ≥24.25 GHz, due to the increased requirement in the subcarrier spacing and reduced symbol length. Furthermore, when the frequency band operates in a high frequency range, the CP-OFDM spectrum leakage and the peak-to-average ratio are both increased.

SUMMARY

The example embodiments disclosed herein are directed to solving the issues related to one or more problems presented in the prior art, as well as providing additional features that will become readily apparent by reference to the following detailed description when taken in conjunction with the accompany drawings. In accordance with various embodiments, example systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

The OFDM technology uses CP to solve the multipath delay problem and divides the frequency selective channel into a set of parallel flat fading channels, which simplifies the channel estimation method. The DFT-s-OFDM (Discrete Fourier Transform Spread OFDM) technology is based on CP-OFDM and adds discrete Fourier transform DFT before subcarrier mapping, which solves the high PAPR (Peak Average Power Ratio) problem in the CP-OFDM. CP-OFDM-based waveforms is continuously being used in 5G NR (Fifth Generation New Radio). Although the CP can resist multipath delay, the CP does not carry any useful data, which increases the wireless resource overhead. This resource overhead problem caused by the CP become more sever, especially when the frequency band operates in a high frequency range, e.g., ≥24.25 GHz, due to the increased requirement in the subcarrier spacing and reduced symbol length. Furthermore, the CP-OFDM based spectrum waveform leakage is also relatively large. The 5G NR supports the mixed use of different parameter sets (e.g., Numerology), that is, supports different sub-carrier spacings between adjacent sub-bands, and therefore, certain interference occurs between adjacent sub-bands. Although spectrum leakage and interference between sub-bands can be slightly reduced by some implementation techniques, such as using a soft CP or a filtering method, a certain guard interval is still required between sub-bands of different sub-carrier spacing. This reduces spectral efficiency. For high-frequency scenarios, the current IEEE 802.11ad protocol uses Single Carrier (SC) technology, which has a low PAPR. The GI (Guard Interval) has the advantages of supporting channel estimation, time/frequency tracking, and phase noise compensation. However, the length of the GI is fixed and cannot be flexibly adapted to changes in the wireless channel environment, thereby reducing spectral efficiency. Therefore, there exists a need to develop a method and apparatus to reduce the resource overhead caused by fixed CP/GI, and also can well suppress out-of-band leakage, maintain low PAPR and high channel estimation accuracy.

In one embodiment, a method for data modulation by a wireless communication node of a wireless communication system, includes: inserting at least one first dummy sequence to a first data sequence in a first data block; and inserting at least one second dummy sequence to a second data sequence in a second data block; wherein a first length of a first dummy sequence is different from a second length of a second dummy sequence, and wherein the second dummy sequence includes the first dummy sequence or is included in the first dummy sequence.

In a further embodiment, a method for data modulation by a wireless communication device of a wireless communication system, includes: receiving a first data block from a wireless communication node, wherein the first data block comprises at least one first dummy sequence and a first data sequence; and receiving a second data block from the wireless communication node, wherein the second data block comprises at least one second dummy sequence and a second data sequence; wherein a first length of a first dummy sequence is different from a second length of a second dummy sequence, and wherein the second dummy sequence includes the first dummy sequence or is included in the first dummy sequence.

In another embodiment, a method for data modulation by a wireless communication device of a wireless communication system, includes: inserting at least one first dummy sequence to a first data sequence in a first data block; and inserting at least one second dummy sequence to a second data sequence in a second data block; wherein a first length of a first dummy sequence is different from a second length of a second dummy sequence, and wherein the second dummy sequence includes the first dummy sequence or is included in the first dummy sequence.

In another embodiment, a method for data modulation by a wireless communication node of a wireless communication system, includes: receiving a first data block from a wireless communication device, wherein the first data block comprises at least one first dummy sequence and a first data sequence; and receiving a second data block from the wireless communication device, wherein the second data block comprises at least one second dummy sequence and a second data sequence; wherein a first length of a first dummy sequence is different from a second length of a second dummy sequence, and wherein the second dummy sequence includes the first dummy sequence or is included in the first dummy sequence.

Yet in another embodiment, a computing device comprising at least one processor and a memory coupled to the processor, the at least one processor configured to carry out the method.

Yet, in another embodiment, a non-transitory computer-readable medium having stored thereon computer-executable instructions for carrying out the method.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION

Figure 1A:
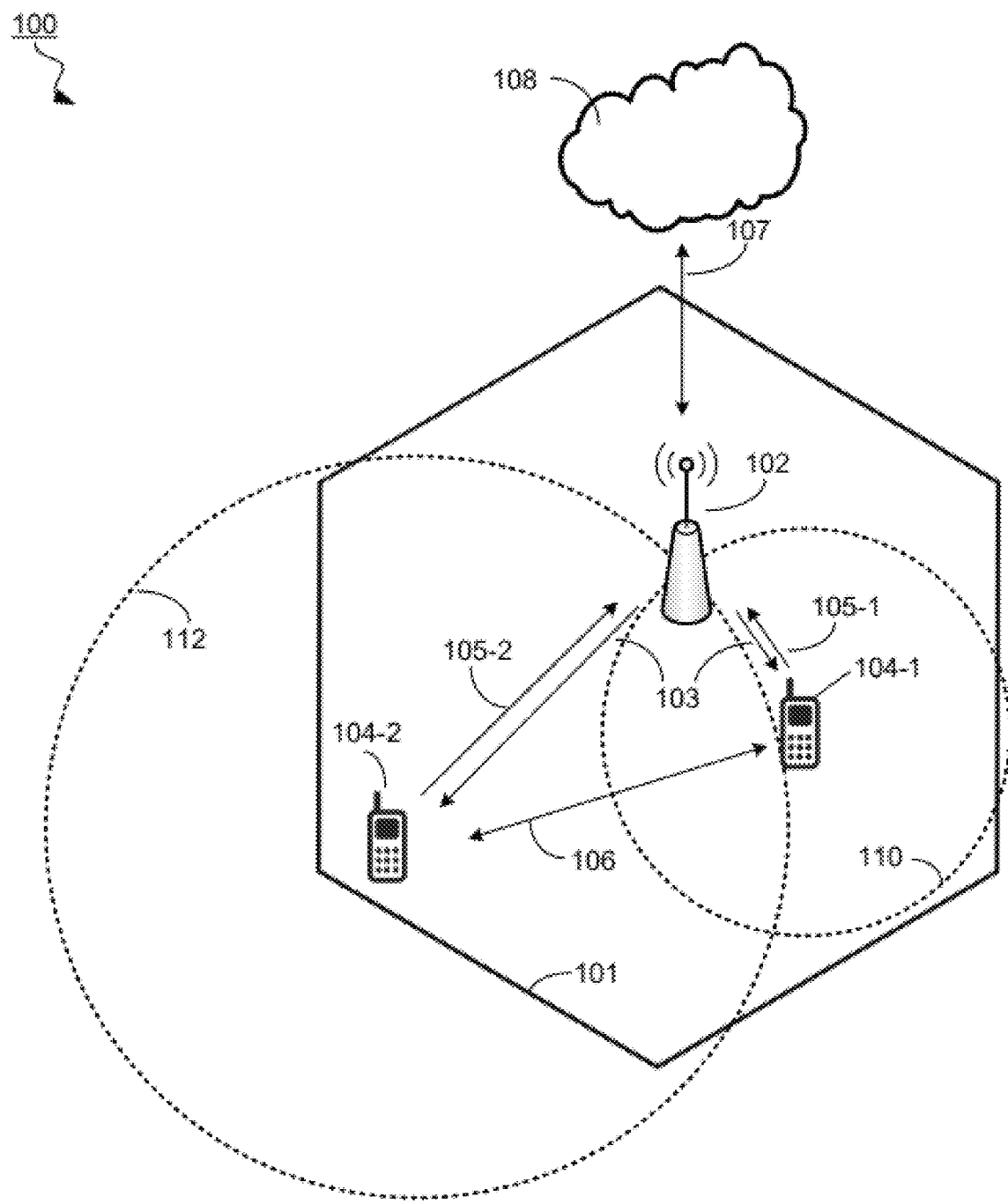
FIG. 1A illustrates an example wireless communication network, in accordance with some embodiments of the present disclosure.

Various example embodiments of the solutions are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the example embodiments and applications described or illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates an example wireless communication network 100, in accordance with some embodiments of the present disclosure. In a wireless communication system, a network side communication node or a base station (BS) can be a node B, an E-utran Node B (also known as Evolved Node B, eNodeB or eNB), a pico station, a femto station, or the like. A terminal side node or a user equipment (UE) can be a long range communication system like a mobile phone, a smart phone, a personal digital assistant (PDA), tablet, laptop computer, or a short range communication system such as, for example a wearable device, a vehicle with a vehicular communication system and the like. A network and a terminal side communication node are represented by a BS 102 and a UE 104, respectively, which are generally referred to as "communication nodes" hereinafter in all the embodiments in this disclosure. Such communication nodes may be capable of wireless and/or wired communications, in accordance with some embodiments of the invention. It is noted that all the embodiments are merely preferred examples, and are not intended to limit the present disclosure. Accordingly, it is understood that the system may include any desired combination of UE's and BSs, while remaining within the scope of the present disclosure.

Referring to FIG. 1A, the wireless communication network 100 includes a BS 102 and a UE 104a, and a UE 104b (collectively referred to as UE's 104 herein). The BS 102 and the UE's 104 are contained within a geographic boundary of cell 101. A wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. Although only 2 UE's 104 are shown in FIG. 1A, it should be noted that any number of UE's 104 can be included in the cell 101 and are within the scope of this invention. In some embodiments, the coverage of uplink communication 105b is larger than that of the uplink communication 105a, as indicated by dotted circles 112 and 110, respectively. The BS 102 is located at the intercept region of the coverage areas 110 and 112 in order for the BS 102 to perform uplink communication with the UE 104a and UE 104b in the cell 101.

The direct communication channels 105/103 between the UE's 104 and the BS 102 can be through interfaces such as an Uu interface, which is also known as UMTS (Universal Mobile Telecommunication System (UMTS) air interface. The direct communication channels (sidelink transmission) 106 between the UE's can be through a PC5 interface, which is introduced to address high moving speed and high density applications such as Vehicle-to-Vehicle (V2V) communications. The BS 102 is connected to a core network (CN) 108 through an external interface 107, e.g., an Iu interface.

The UE's 104a and 104b obtains its synchronization timing from the BS 102, which obtains its own synchronization timing from the core network 108 through an internet time service, such as a public time NTP (Network Time Protocol) server or a RNC (Radio Frequency Simulation System Network Controller) server. This is known as network-based synchronization. Alternatively, the BS 102 can also obtain synchronization timing from a Global Navigation Satellite System (GNSS) (not shown) through a satellite signal 106, especially for a large BS in a large cell which has a direct line of sight to the sky, which is known as satellite-based synchronization.

Figure 1B:
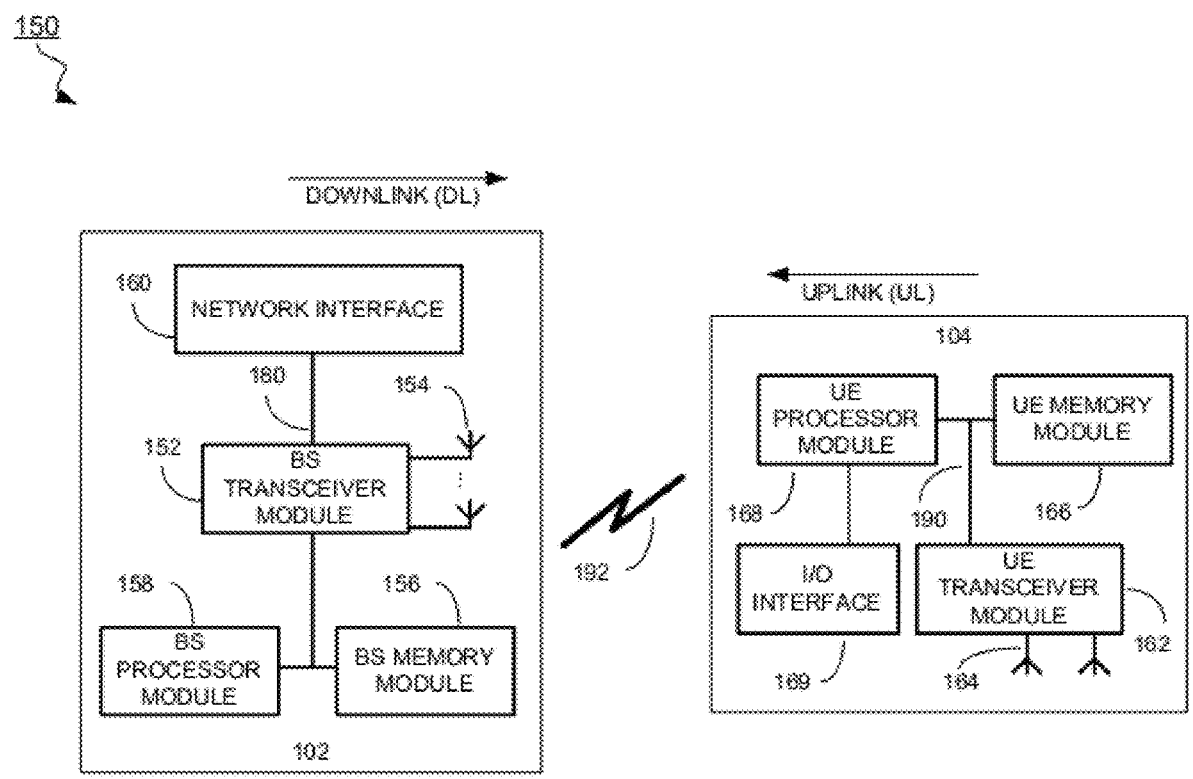
FIG. 1B illustrates a block diagram of an example wireless communication system, in accordance with some embodiments of the present disclosure.

FIG. 1B illustrates a block diagram of an example wireless communication system 150, in accordance with some embodiments of the present disclosure. The system 150 may include components and elements configured to support known or conventional operating features that need not be described in detail herein. In one example embodiment, system 150 can be used to transmit and receive data symbols in a wireless communication environment such as the wireless communication network 100 of FIG. 1A, as described above.

System 150 generally includes a BS 102 and two UEs 104a and 104b, collectively referred to as UE 104 below for ease of discussion. The BS 102 includes a BS transceiver module 152, a BS antenna array 154, a BS memory module 156, a BS processor module 158, and a Network interface 160, each module being coupled and interconnected with one another as necessary via a data communication bus 180. The UE 104 includes a UE transceiver module 162, a UE antenna 164, a UE memory module 166, a UE processor module 168, and an input/output (I/O) interface 169, each module being coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, system 150 may further include any number of blocks, modules, circuits, etc. other than those shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. In accordance with some embodiments, a UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. Preferably, there is close synchronization timing with only a minimal guard time between changes in duplex direction. The UE transceiver 162 communicates through the UE antenna 164 with the BS 102 via the wireless communication channel 192 or with other UEs via the wireless communication channel 193. The wireless communication channel 193 can be any wireless channel or other medium known in the art suitable for sidelink transmission of data as described herein.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some embodiments, the BS transceiver 152 is configured to transmit the physical downlink control channel (PDCCH) and configured slot structure related information (SFI) entry set to the UE transceiver 162. In some embodiments, the UE transceiver 162 is configured to receive PDCCH containing at least one SFI field from the BS transceiver 152. In some example embodiments, the UE transceiver 162 and the BS transceiver 152 are configured to support industry standards such as the Long Term Evolution (LTE) and emerging 5G standards, and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The BS processor modules 158 and UE processor modules 168 are implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Then the UE processor module 168 detects the PHR triggering message on the UE transceiver module 162, the UE processor module 168 is further configured to determine at least one second SFI entry set based on at least one predefined algorithm and the received at least one first SFI entry set configured by the BS 102, wherein the at least one predefined algorithm is selected based on other parameters calculated or messages received. The UE processor module 168 is further configured to generate the at least one second SFI entry set and monitor the PDCCH received on the UE transceiver module 162 to further receive the at least one SFI field. As used herein, "SFI entry set" means SFI table or SFI entries.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. Memory modules 156 and 166 may also each include non-volatile memory for storing instructions to be executed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or core network over a wired or wireless connection.

Referring again to FIG. 1A, as mentioned above, the BS 102 repeatedly broadcasts system information associated with the BS 102 to one or more UEs (e.g., 104) so as to allow the UE 104 to access the network within the cell 101 where the BS 102 is located, and in general, to operate properly within the cell 101. Plural information such as, for example, downlink and uplink cell bandwidths, downlink and uplink configuration, configuration for random access, etc., can be included in the system information, which will be discussed in further detail below. Typically, the BS 102 broadcasts a first signal carrying some major system information, for example, configuration of the cell 101 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)), which are herein referred to as "second broadcast signal," "third broadcast signal," and so on.

Referring again to FIG. 1B, in some embodiments, the major system information carried by the first broadcast signal may be transmitted by the BS 102 in a symbol format via the communication channel 192. In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (demapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

In some embodiments, the UE 104 can operate in a hybrid communication network in which the UE communicates with the BS 102, and with other UEs, e.g., between 104*a* and 104*b*. As described in further detail below, the UE 104 supports sidelink communications with other UE's as well as downlink/uplink communications between the BS 102 and the UE 104. As discussed above, sidelink communication allows the UEs 104*a* and 104*b* to establish a direct communication link with each other, or with other UEs from different cells, without requiring the BS 102 to relay data between UE's.

Figure 2:
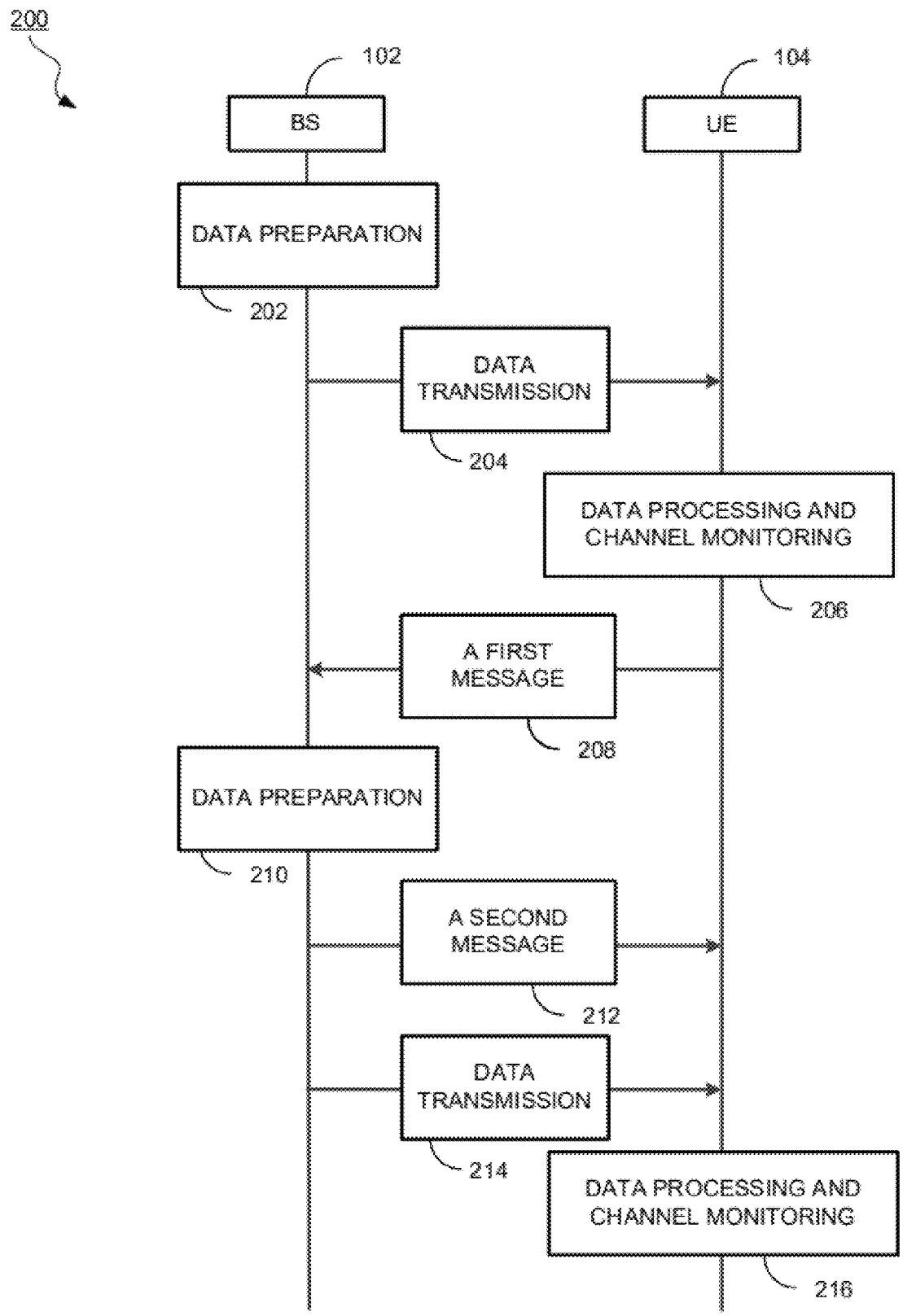
FIG. 2 illustrates a method for inserting dummy sequences during data modulation in a wireless communication system, in accordance with some embodiments of the present disclosure.

FIG. 2 illustrates a method 200 for inserting dummy sequences during data modulation in a wireless communication system, in accordance with some embodiments of the present disclosure. It is understood that additional operations may be provided before, during, and after the method 200 of FIG. 2, and that some operations may be omitted or reordered. The communication system in the illustrated embodiment comprises a BS 102 and a UE 104. In the illustrated embodiments, a UE 104 is in one of at least one serving cell covered by the BS 102, i.e., the UE 104 is in connection with the BS 102. In some embodiments, the BS 102 is a wireless access point or a wireless communication node. In some other embodiments, the UE 104 is a wireless station or a wireless communication device. It should be noted that any numbers of BS 102 or UE 104 can be used and are within the scope of this invention.

The method 200 starts with operation 202 in which download (DL) data is prepared by the BS 102 according to some embodiments. In some embodiments, a data preparation performed by the BS 102 prior to a transmission of the DL data to the UE 104 comprises at least one of the following processes, dividing the DL data into a plurality of first data sequences with a first length, inserting at least one dummy sequence to the plurality of first data sequences, performing a discrete Fourier transform (DFT), performing a subcarrier mapping in the frequency domain, inserting at least one guard subcarrier, performing an inverse fast Fourier transform (IFFT), filtering a plurality of first blocks, and digital-to-analog converting the plurality of first blocks which are then transmitted through transmitting antennas of the BS 102 to receiving antennas of the UE 104. In some embodiments, the at least one dummy sequence is inserted for at least one reason including but not limited to: Cyclic Prefix, assisted phase tracing, assisted channel estimation, and synchronization. In some embodiments, a dummy sequence can also be named as a reference sequence. The preparation performed by the BS 102 in operation 202 is also discussed in detail in FIG. 4.

The method 200 continues with operation 204 in which the plurality of first blocks is transmitted from the BS 102 to the UE 104 according to some embodiments. In some embodiments, each of the plurality of first blocks comprises at least one of the following: a plurality of first data blocks, at least one reference signal block, and at least one synchronization block. In some embodiments, each of the plurality of first data blocks comprises a first data sequence and a first dummy sequence.

In some embodiments, the first dummy sequence is selected by the BS 102 from a dummy sequence set. In some embodiments, the dummy sequence set comprises a plurality of dummy sequences. In some embodiments, the dummy sequence set is pre-determined by the system. In some embodiments, the dummy sequence set comprises a plurality of dummy sequences (i.e., a first number, A, of dummy sequences), wherein each of the plurality of dummy sequences comprises M elements, i.e., a length of the dummy sequence M, wherein M is a positive integer and M is less than a length of a block, and where A is a positive integer. In some embodiments, each of the M elements is a complex number with a constant modulus value. In some embodiments, the dummy sequence set comprises at least one base sequence and a second number of dummy sequences (e.g., P) in the dummy sequence set comprises at least one base sequence at the end, wherein P is a positive integer and P≤A, e.g., the second dummy sequence 308 comprises the first dummy sequence 306 at the end. In some embodiments, the plurality of dummy sequences in the dummy sequence set may have a same number of elements with different values. In some embodiments, each of the plurality of dummy sequences in the dummy sequence set has a sequence index number. In some other embodiments, the first dummy sequence is cut out from one of the following: a Zadoff-Chu (ZC) sequence, a Golay Complementary sequence, and a Maximum-length (M) sequence.

The method 200 continues with operation 206 in which the plurality of first blocks is processed and channel is monitored by the UE 104 according to some embodiments. In some embodiments, processing to the plurality of first blocks comprises at least one of the following: performing DFT transform on the plurality of first data blocks to the frequency domain, performing frequency domain equalization, transforming into the time domain using IFFT, removing the at least one reference block, and performing decoding and demodulation. In some embodiments, monitoring of the channel in order to obtain a channel status is performed according to the at least one reference block in the plurality of first blocks.

The method 200 continues with operation 208 in which a first message is transmitted from the UE 104 to the BS 102 according to some embodiments. In some embodiments, the first message comprises the channel status determined by the UE 104 according to the at least one reference block received from the BS 102. In some embodiments, the channel status comprises multipath delay. In some embodiments, the first message is transmitted through a physical uplink control channel (PUCCH). In some other embodiments, the first message is transmitted in a radio resource control (RRC) message.

The method 200 continues with operation 210 in which the DL data is further prepared according to some embodiments. In some embodiments, a second dummy sequence is determined according to the channel status received in the first message from the dummy sequence set. In some embodiments, a data preparation performed by the BS prior to a transmission of the DL data to the UE 104 comprises at least one of the following processes, dividing the DL data into a plurality of second data sequences with a second length, inserting at least one dummy sequence to the plurality of second data sequences, performing a discrete Fourier transform (DFT), performing a subcarrier mapping in the frequency domain, inserting at least one guard subcarrier, performing an inverse fast Fourier transform (IFFT), filtering a plurality of second blocks, and digital-to-analog converting the plurality of second blocks which are then transmitted through transmitting antennas of the BS 102 to receiving antennas of the UE 104. In some embodiments, each of the plurality of second blocks comprises at least one of the following: a plurality of second data blocks, at least one reference block, and at least one synchronization block. In some embodiments, each of the plurality of second data blocks comprises a second data sequence and the second dummy sequence. In some other embodiments, the second dummy sequence is cut out from one of the following: a Zadoff-Chu (ZC) sequence, a Golay Complementary sequence, and a Maximum-length (M) sequence.

The method 200 continues with operation 212 in which a second message is transmitted from the BS 102 to the UE 104 according to some embodiments. In some embodiments, the second message comprises a dummy sequence index of the second dummy sequence used together with the second data sequence to construct the second data block. In some other embodiments, the dummy sequence index of the second dummy sequence can be transmitted from the BS 102 to the UE 104 implicitly, in which case, operation 212 can be omitted.

The method 200 continues with operation 214 in which the second plurality of blocks is transmitted from the BS 102 to the UE 104 according to some embodiments.

The method 200 continues with operation 216 in which the plurality of second blocks is processed and channel is monitored by the UE 104 according to some embodiments. In some embodiments, processing to the plurality of second blocks comprises at least one of the following: performing DFT transform on the plurality of second data blocks to the frequency domain, performing frequency domain equalization, transforming into the time domain using IFFT, removing the at least one reference block, and performing decoding and demodulation. In some embodiments, monitoring of the channel in order to obtain a channel status is performed according to the at least one reference block in the plurality of second blocks.

It should be noted that there can be more than one UE 104, i.e., a plurality of UEs in the serving cell of the BS 102. In this case, time-division multiplexing can be used to transmit DL data from the BS 102 to each of the plurality of UEs through different data blocks 302. Different data blocks 302 for different UEs may comprises at least one dummy sequence that is determined according to the channel status of between each of the plurality of UEs and the BS 102, e.g., different dummy sequences for different UEs with different channel status. When there are changes in the channel status (e.g., multipath delay), the BS 102 may change the dummy sequences for different UEs.

Figure 3A:
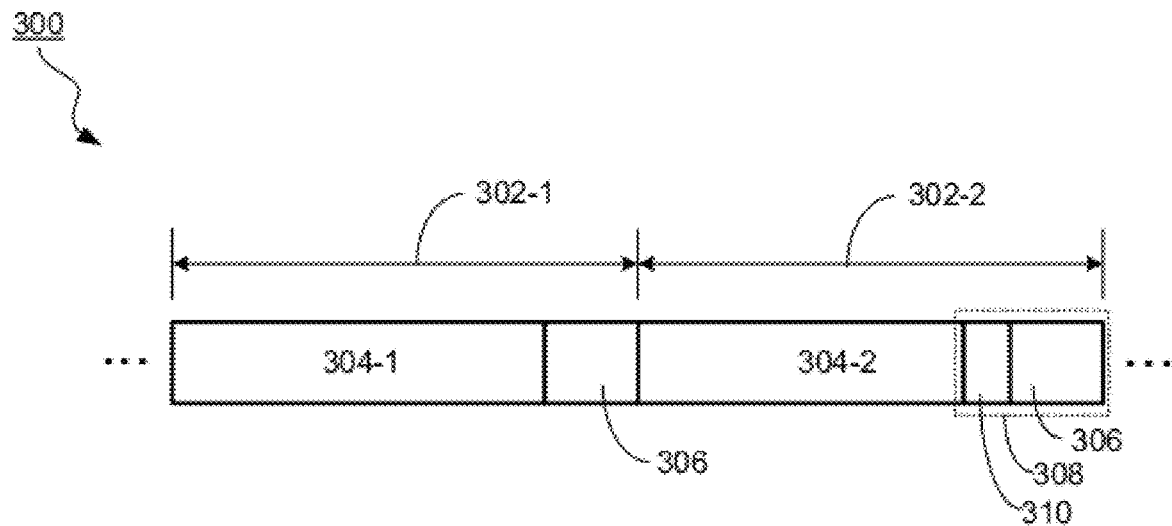
FIG. 3A illustrates a schematic of data blocks, in accordance with some embodiments of the present disclosure.

FIG. 3A illustrates a schematic 300 of data blocks, in accordance with some embodiments of the present disclosure. In the illustrated embodiment, the schematic 300 comprises 2 data blocks, i.e., a first data block 302-1 and a second data block 302-2. It should be noted in the illustrated embodiment, only 2 neighboring data blocks from a DL or uplink (UL) data are shown for discussion purposes and the DL/UL data can comprise any numbers of data blocks. For example, there can be at least one first data block before the first data block 302-1 or at least one second data block after the second data block 302-2. It should be also noted, the first data block 302-1 and the second data block 302-2 can be also separated by at least one other block, wherein the at least one other block can be one of the following: a reference block and a synchronization block, which are discussed further in detail in FIGS. 3E-3F below.

In the illustrated embodiments, the first data block 302-1 comprises a first data sequence 304-1, and the second data block comprises a second data sequence 304-2. In the illustrated embodiments, the first data sequence 304-1 is longer than the second data sequence 304-2, i.e., the first data sequence 304-1 comprises more data or elements than the second data sequence 304-2. In some embodiments, both the first data sequence 304-1 and the second data sequence 304-2 are smaller than the size of the corresponding data block, e.g., 302-1 and 302-2.

Further, the first data block 302-1 comprises a first dummy sequence 306-1, wherein the first dummy sequence 306 is directly inserted at the end of the first data sequence 304-1. In the illustrated embodiment, the length of the first data block 302-1 is a summation of the length of the first data sequence 304-1 and the length of the first dummy sequence 306. Similarly, the second data block 302-2 comprises a second dummy sequence 308, wherein the second dummy sequence 308 is directly inserted at the end of the second data sequence 304-2. In the illustrated embodiment, the length of the second data block 302-2 is a summation of the length of the second data sequence 304-2 and the length of the second dummy sequence 308. In the illustrated embodiment, the second dummy sequence 308 is longer than the first dummy sequence 306. In the illustrated embodiment, the second dummy sequence 308 comprises a sequence 310 and the first dummy sequence 306. Using this method, if the two data block 302-1 and 302-2 are for the same UE 104, when an increased multipath delay is detected during a transmission of data, a longer dummy sequence and a shorter data sequence can be dynamically constructed so as to increase the resistance to multipath interference. Using this method, if the two data blocks 302 are from two different UEs, e.g., the first data block 302-1 is from a first UE and the second data block 302-2 is from a second UE, the second UE can resist a greater multipath delay than the first UE.

In some embodiments, the first dummy sequence 306 and the second dummy sequence 308 are selected from a dummy sequence set according to channel status. In some embodiments, the dummy sequence set is pre-determined by the system. In some embodiments, the dummy sequence set comprises a plurality of dummy sequences (i.e., a first number, A, of dummy sequences), wherein each of the plurality of dummy sequences comprises M elements, i.e., a length of the dummy sequence M, wherein M is a positive integer and M is less than a length of a block, and where A is a positive integer. In some embodiments, each of the M elements is a complex number with a constant modulus value. In some embodiments, the dummy sequence set comprises at least one base sequence and a second number of dummy sequences (e.g., P) in the dummy sequence set comprises at least one base sequence at the end, wherein P is a positive integer and P≤A, e.g., the second dummy sequence 308 comprises the first dummy sequence 306 at the end. In some embodiments, the plurality of dummy sequences in the dummy sequence set may have a same number of elements with different values. In some embodiments, each of the plurality of dummy sequences in the dummy sequence set has a sequence index number. In some other embodiments, the first dummy sequence 306 and the second dummy sequence 308 are cut out from one of the following: a Zadoff-Chu (ZC) sequence, a Golay Complementary sequence, and a Maximum-length (M) sequence.

Figure 3B:
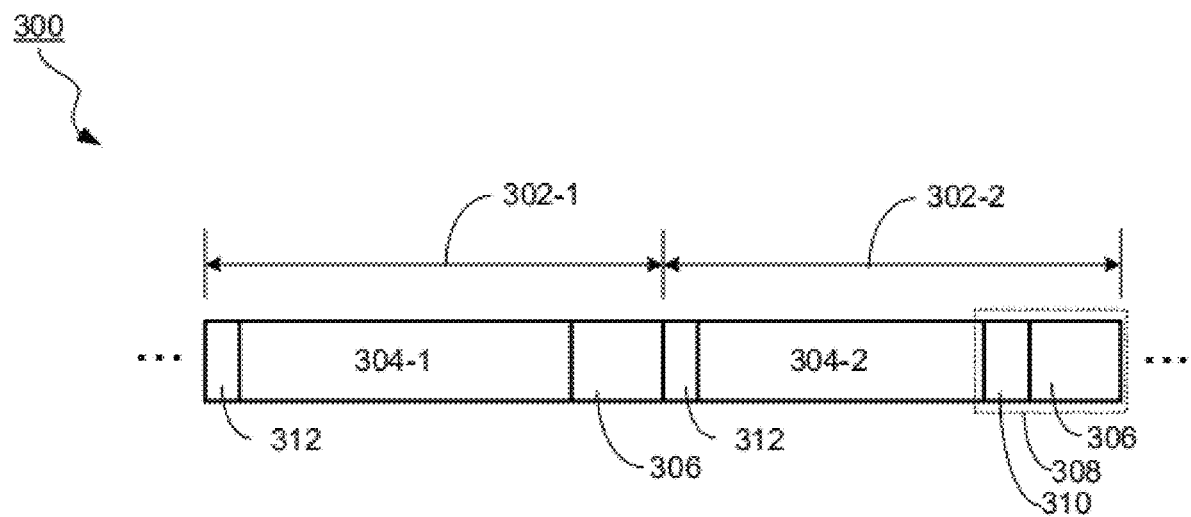
FIG. 3B illustrates a schematic of data blocks, in accordance with some embodiments of the present disclosure.

FIG. 3B illustrates a schematic 300 of data blocks, in accordance with some embodiments of the present disclosure. In the illustrated embodiment, the schematic 300 comprises 2 data blocks, i.e., a first data block 302-1 and a second data block 302-2. In some other embodiments, the first data block 302-1 and the second data block 302-2 each has a window size for FFT processing. It should be noted in the illustrated embodiment, only 2 neighboring data blocks from a DL or UL data are shown for discussion purposes and the DL/UL data can comprise any numbers of data blocks. For example, there can be at least one first data block before the first data block 302-1 or at least one second data block after the second data block 302-2. It should be also noted, the first data block 302-1 and the second data block 302-2 can be also separated by at least one other block, wherein the at least one other block can be one of the following: a reference block and a synchronization block, which are discussed further in detail in FIGS. 3E-3F below.

In the illustrated embodiments, the first data block 302-1 comprises a first data sequence 304-1, and the second data block comprises a second data sequence 304-2. In the illustrated embodiments, the first data sequence 304-1 is longer than the second data sequence 304-2, i.e., the first data sequence 304-1 comprises more data or elements than the second data sequence 304-2. In some embodiments, both the first data sequence 304-1 and the second data sequence 304-2 are smaller than the size of the corresponding data block, e.g., 302-1 and 302-2.

Further, the first data block 302-1 comprises a first dummy sequence 306-1 and a third dummy sequence 312, wherein the first dummy sequence 306 is directly inserted at the end of the first data sequence 304-1 and the third dummy sequence 312 is directly inserted at the beginning of the first data sequence 304-1. In the illustrated embodiment, the length of the first data block 302-1 is a summation of the length of the first data sequence 304-1, the length of the first dummy sequence 306, and the length of a third dummy sequence 312. Similarly, the second data block 302-2 comprises a second dummy sequence 308 and a third dummy sequence, wherein the second dummy sequence 308 is directly inserted at the end of the second data sequence 306-2 and the third dummy sequence 312 is directly inserted at the beginning of the second data sequence 304-2. In the illustrated embodiment, the length of the second data block 302-2 is a summation of the length of the second data sequence 304-2, the length of the second dummy sequence 308, and the length of the third dummy sequence 312. In the illustrated embodiment, the second dummy sequence 308 is longer than the first dummy sequence 306. In the illustrated embodiment, the second dummy sequence 308 comprises a sequence 310 and the first dummy sequence 306.

In some other embodiments, the third dummy sequence 312 can be also inserted to the end of the first dummy sequence 306 and the end of the second dummy sequence 308. In this case, the time window for FFT processing is defined between the beginning of a third dummy sequence 312 and the beginning of an immediate following third dummy sequence 312. Using this method, when an increased multipath delay is detected during a transmission of data, a longer dummy sequence and a shorter data sequence can be dynamically constructed so as to increase resistance to multipath interference. The extra third dummy sequences 312 can reduced the interference between blocks caused by multipath delay and also reduced out-of-band leakage.

In some embodiments, the first dummy sequence 306, the second dummy sequence 308 and the third dummy sequence 312 are selected from a dummy sequence set according to channel status. In some embodiments, the dummy sequence set is pre-determined by the system. In some embodiments, the dummy sequence set comprises a plurality of dummy sequences (i.e., a first number, A, of dummy sequences), wherein each of the plurality of dummy sequences comprises M elements, i.e., a length of the dummy sequence M, wherein M is a positive integer and M is less than a length of a block, and where A is a positive integer. In some embodiments, each of the M elements is a complex number with a constant modulus value. In some embodiments, the dummy sequence set comprises at least one base sequence and a second number of dummy sequences (e.g., P) in the dummy sequence set comprises at least one base sequence at the end, wherein P is a positive integer and P≤A, e.g., the second dummy sequence 308 comprises the first dummy sequence 306 at the end. In some embodiments, the plurality of dummy sequences in the dummy sequence set may have a same number of elements with different values. In some embodiments, each of the plurality of dummy sequences in the dummy sequence set has a sequence index number. In some other embodiments, the first dummy sequence 306, the second dummy sequence 308, and the third dummy sequence 312 are cut out from one of the following: a Zadoff-Chu (ZC) sequence, a Golay Complementary sequence, and a Maximum-length (M) sequence.

Figure 3C:
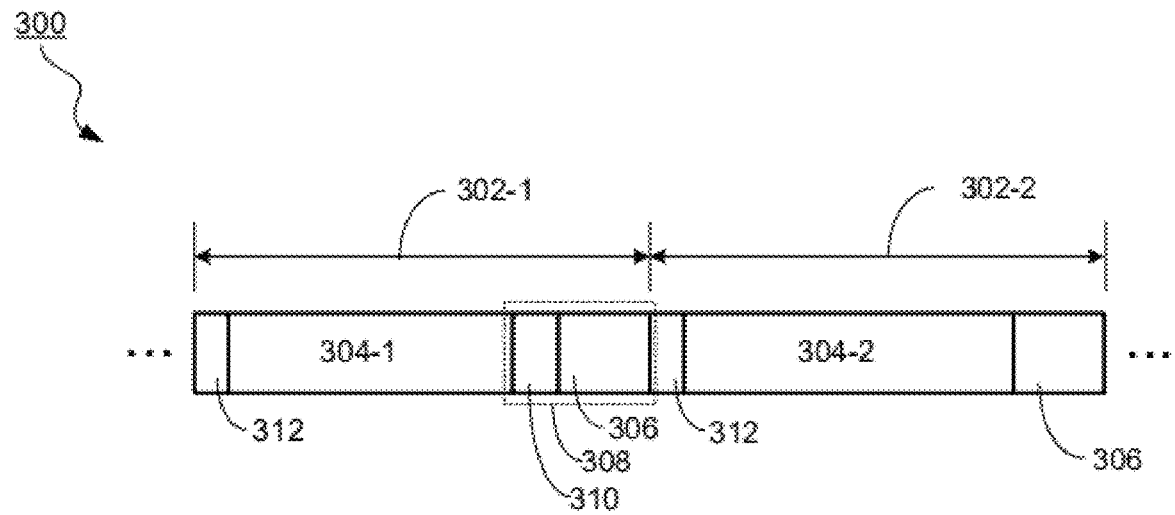
FIG. 3C illustrates a schematic of data blocks, in accordance with some embodiments of the present disclosure.

FIG. 3C illustrates a schematic 300 of data blocks, in accordance with some embodiments of the present disclosure. In the illustrated embodiment, the schematic 300 comprises 2 data blocks, i.e., a first data block 302-1 and a second data block 302-2. In some other embodiments, the first data block 302-1 and the second data block 302-2 each has a window size for FFT processing. It should be noted in the illustrated embodiment, only 2 neighboring data blocks from a DL or UL data are shown for discussion purposes and the DL/UL data can comprise any numbers of data blocks. For example, there can be at least one first data block before the first data block 302-1 or at least one second data block after the second data block 302-2. It should be also noted, the first data block 302-1 and the second data block 302-2 can be also separated by at least one other block, wherein the at least one other block can be one of the following: a reference block and a synchronization block, which are discussed further in detail in FIGS. 3E-3F below.

In the illustrated embodiments, the first data block 302-1 comprises a first data sequence 304-1, and the second data block comprises a second data sequence 304-2. In the illustrated embodiments, the first data sequence 304-1 is shorter than the second data sequence 304-2, i.e., the first data sequence 304-1 comprises less data or elements than the second data sequence 304-2. In some embodiments, both the first data sequence 304-1 and the second data sequence 304-2 are both smaller than the size of the corresponding data block, e.g., 302-1 and 302-2.

Further, the second data block 302-2 comprises a first dummy sequence 306 and a third dummy sequence 312, wherein the first dummy sequence 306 is directly inserted at the end of the second data sequence 304-2 and the third dummy sequence 312 is directly inserted at the beginning of the second data sequence 304-2. In the illustrated embodiment, the length of the second data block 302-2 is a summation of the length of the second data sequence 304-2, the length of the first dummy sequence 306, and the length of the third dummy sequence 312. Similarly, the first data block 302-1 comprises a second dummy sequence 308 and a third dummy sequence 312, wherein the second dummy sequence 308 is directly inserted at the end of the first data sequence 304-1 and the third dummy sequence 312 is directly inserted at the beginning of the first data sequence 304-1. In the illustrated embodiment, the length of the first data block 302-1 is a summation of the length of the first data sequence 304-1, the length of the second dummy sequence 308, and the length of the third dummy sequence 312. In the illustrated embodiment, the second dummy sequence 308 is longer than the first dummy sequence 306. In the illustrated embodiment, the second dummy sequence 308 comprises a sequence 310 and the first dummy sequence 306.

Using this method, when a decreased multipath delay is detected during a transmission of data, a shorter dummy sequence and a longer data sequence can be dynamically constructed so as to improve the frequent efficiency. The extra third dummy sequences 312 is inserted to reduce the interference between blocks caused by multipath delay and also reduced out-of-band leakage.

In some embodiments, the first dummy sequence 306, the second dummy sequence 308, and the third dummy sequence 312 are selected from a dummy sequence set according to channel status. In some embodiments, the dummy sequence set is pre-determined by the system. In some embodiments, the dummy sequence set comprises a plurality of dummy sequences (i.e., a first number, A, of dummy sequences), wherein each of the plurality of dummy sequences comprises M elements, i.e., a length of the dummy sequence M, wherein M is a positive integer and M is less than a length of a block, and where A is a positive integer. In some embodiments, each of the M elements is a complex number with a constant modulus value. In some embodiments, the dummy sequence set comprises at least one base sequence and a second number of dummy sequences (e.g., P) in the dummy sequence set comprises at least one base sequence at the end, wherein P is a positive integer and P≤A, e.g., the second dummy sequence 308 comprises the first dummy sequence 306 at the end. In some embodiments, the plurality of dummy sequences in the dummy sequence set may have a same number of elements with different values. In some embodiments, each of the plurality of dummy sequences in the dummy sequence set has a sequence index number. In some other embodiments, the first dummy sequence 306, the second dummy sequence 308, and the third dummy sequence 312 are cut out from one of the following: a Zadoff-Chu (ZC) sequence, a Golay Complementary sequence, and a Maximum-length (M) sequence.

Figure 3D:
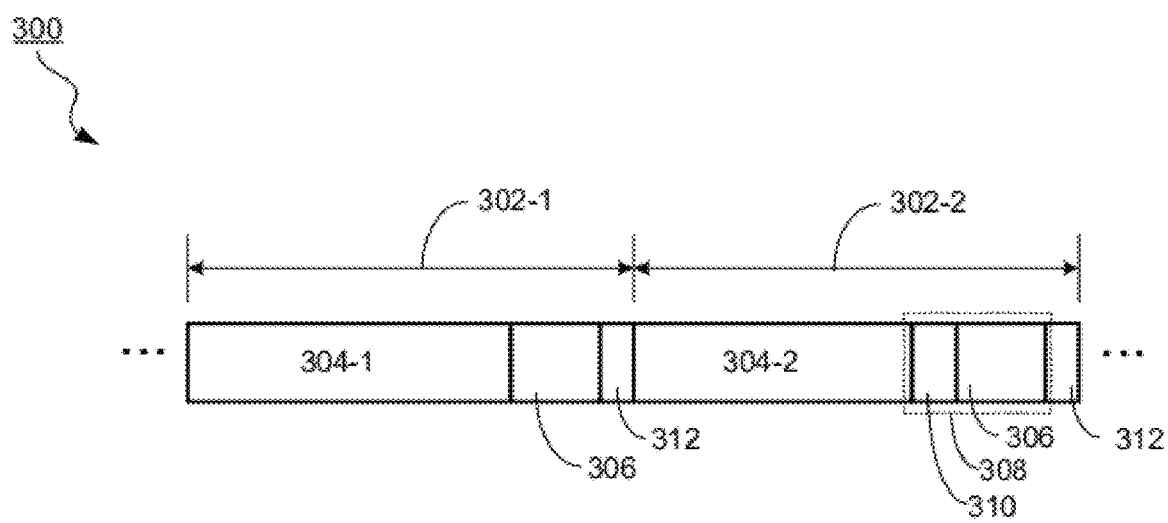
FIG. 3D illustrates a schematic of data blocks, in accordance with some embodiments of the present disclosure.

FIG. 3D illustrates a schematic 300 of data blocks, in accordance with some embodiments of the present disclosure. In the illustrated embodiment, the schematic 300 comprises 2 data blocks, i.e., a first data block 302-1 and a second data block 302-2. In some other embodiments, the first data block 302-1 and the second data block 302-2 each has a window size for FFT processing. It should be noted in the illustrated embodiment, only 2 neighboring data blocks from a DL or UL data are shown for discussion purposes and the DL/UL data can comprise any numbers of data blocks. For example, there can be at least one first data block before the first data block 302-1 or at least one second data block after the second data block 302-2. It should be also noted, the first data block 302-1 and the second data block 302-2 can be also separated by at least one other block, wherein the at least one other block can be one of the following: a reference block and a synchronization block, which are discussed further in detail in FIGS. 3E-3F below.

In the illustrated embodiments, the first data block 302-1 comprises a first data sequence 304-1, and the second data block comprises a second data sequence 304-2. In the illustrated embodiments, the first data sequence 304-1 is longer than the second data sequence 304-2, i.e., the first data sequence 304-1 comprises more data or elements than the second data sequence 304-2. In some embodiments, both the first data sequence 304-1 and the second data sequence 304-2 are smaller than the size of the corresponding data block, e.g., 302-1 and 302-2.

Further, the first data block 302-1 comprises a first dummy sequence 306 and a third dummy sequence 312, wherein the first dummy sequence 306 is directly inserted at the end of the first data sequence 304-1 and the third dummy sequence 312 is directly inserted at the end of the first dummy sequence 306. In the illustrated embodiment, the length of the first data block 302-1 is a summation of the length of the first data sequence 304-1, the length of the first dummy sequence 306, and the length of the third dummy sequence 312. Similarly, the second data block 302-2 comprises a second dummy sequence 308 and a third dummy sequence 312, wherein the second dummy sequence 308 is directly inserted at the end of the second data sequence 306-2 and the third dummy sequence 312 is directly inserted at the end of the second dummy sequence 308. In the illustrated embodiment, the length of the second data block 302-2 is a summation of the length of the second data sequence 304-2, the length of the second dummy sequence 308, and the length of the third dummy sequence 312. In the illustrated embodiment, the second dummy sequence 308 is longer than the first dummy sequence 306. In the illustrated embodiment, the second dummy sequence 308 comprises a sequence 310 and the first dummy sequence 306.

Using this method, when an increased multipath delay is detected during a transmission of data, a longer dummy sequence and a shorter data sequence can be dynamically constructed so as to improve resistance to multipath interference. The e third dummy sequences 312 is inserted to reduce the interference between blocks caused by multipath delay and also reduced out-of-band leakage.

In some embodiments, the first dummy sequence 306, the second dummy sequence 308, and the third dummy sequence 312 are selected from a dummy sequence set according to channel status. In some embodiments, the dummy sequence set is pre-determined by the system. In some embodiments, the dummy sequence set comprises a plurality of dummy sequences (i.e., a first number, A, of dummy sequences), wherein each of the plurality of dummy sequences comprises M elements, i.e., a length of the dummy sequence M, wherein M is a positive integer and M is less than a length of a block, and where A is a positive integer. In some embodiments, each of the M elements is a complex number with a constant modulus value. In some embodiments, the dummy sequence set comprises at least one base sequence and a second number of dummy sequences (e.g., P) in the dummy sequence set comprises at least one base sequence at the end, wherein P is a positive integer and P≤A, e.g., the second dummy sequence 308 comprises the first dummy sequence 306 at the end. In some embodiments, the plurality of dummy sequences in the dummy sequence set may have a same number of elements with different values. In some embodiments, each of the plurality of dummy sequences in the dummy sequence set has a sequence index number. In some other embodiments, the first dummy sequence 306, the second dummy sequence 308, and the third dummy sequence 312 are cut out from one of the following: a Zadoff-Chu (ZC) sequence, a Golay Complementary sequence, and a Maximum-length (M) sequence.

Figure 3E:
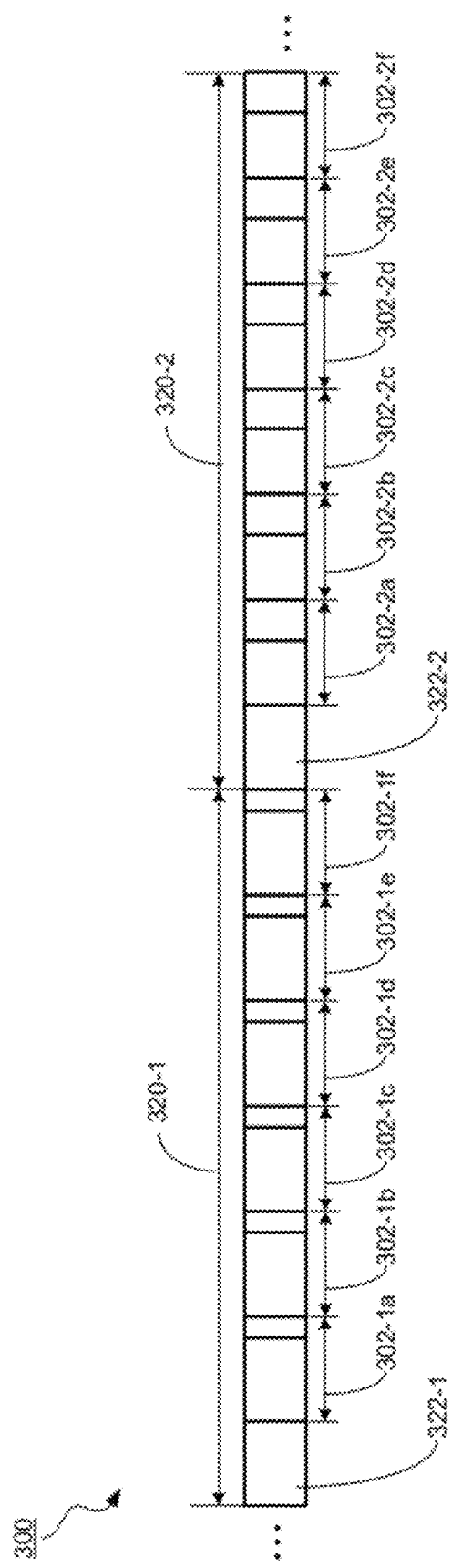
FIG. 3E illustrates a plurality of data blocks in two neighboring frames, in accordance with some embodiments of the present disclosure.

FIG. 3E illustrates a schematic 300 of a plurality of data blocks in two neighboring frames 320, in accordance with some embodiments of the present disclosure. In the illustrated embodiment, the schematic 300 comprises 2 frames, i.e., a first frame 320-1 and a second frame 320-2. In the illustrated embodiments, the first frame 320-1 comprises 6 first data blocks, i.e., 302-1*a*, 302-1*b*, 302-1*c*, 302-1*d*, 302-1*e* and 302-1*f*; and the second frame 320-2 comprises 6 second data blocks, i.e., 302-2*a*, 302-2*b*, 302-2*c*, 302-2*d*, 302-2*e*, and 302-2*f*. In the illustrated embodiments, the 6 first data blocks 302-1 in the first frame 320-1 are directly coupled together one to another in series; and the 6 second data blocks 302-2 in the second frame 320-2 are also directly coupled together one to another in series.

Further each of the 6 first data block 302-1 in the first frame 320-1 comprises a first data sequence and a first dummy sequence, wherein the first dummy sequence is inserted to the end of the first data sequence in the first data block, as discussed in FIG. 3A. In the illustrated embodiments, each of the 6 second data block 302-2 in the second frame 320-2 comprises a second data sequence and a second dummy sequence, wherein the second dummy sequence is inserted to the end of the second data sequence in the second data block, as discussed in FIG. 3B. In the illustrated embodiments, the first frame 320-1 and the second frame 320-2 each comprises a reference block 322-1 and 322-2 before the first first data block 302-1*a* and the first second data block 302-2*a*, respectively. Therefore, the sixth first data block 302-1*f* and the first second data block 302-2*a* is separated by the second reference block 322-2. In some embodiments, even a change in channel status, e.g., reduced multipath delay, is detected within the first frame 320-1, a change in the dummy sequence is implemented in the following frame, e.g., the second frame 320-2.

Figure 3F:
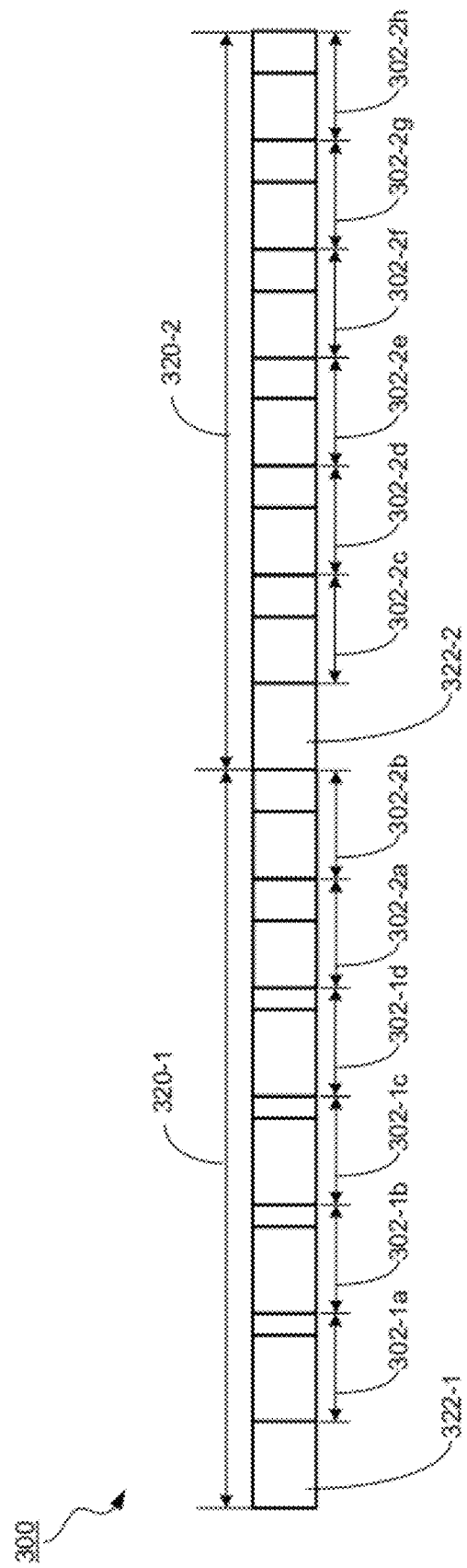
FIG. 3F illustrates a plurality of data blocks in two neighboring frames, in accordance with some embodiments of the present disclosure.

FIG. 3F illustrates a schematic 300 of a plurality of data blocks in two neighboring frames 320, in accordance with some embodiments of the present disclosure. In the illustrated embodiment, the schematic 300 comprises 2 frames, i.e., a first frame 320-1 and a second frame 320-2. In the illustrated embodiments, the first frame 320-1 comprises 4 first data blocks, i.e., 302-1*a*, 302-1*b*, 302-1*c*, and 302-1*d*, and 2 second data blocks 302-2*a* and 302-2*b*; and the second frame 320-2 comprises 6 second data blocks, i.e., 302-2*c*, 302-2*d*, 302-2*e*, 302-2*f*, 302-2*g*, and 302-2*h*. In the illustrated embodiments, the 4 first data blocks 302-1 and the 2 second data block 302-2 in the first frame 320-1 are directly coupled together one to another in series; and the 6 second data blocks 302-2 in the second frame 320-2 are also directly coupled together one to another in series.

Further each of the 4 first data block 302-1 in the first frame 320-1 comprises a first data sequence and a first dummy sequence, wherein the first dummy sequence is inserted to the end of the first data sequence in the first data block, as discussed in FIG. 3A. In the illustrated embodiments, each of the 2 second data block 302-2 in the first frame 320-2 comprises a second data sequence and a second dummy sequence, wherein the second dummy sequence is inserted to the end of the second data sequence in the second data block, as discussed in FIG. 3B. Similarly, each of the 6 second data blocks 302-2 in the second frame 320-2 comprises the second data sequence and the second dummy sequence, wherein the second dummy sequence is inserted to the end of the second data sequence in the second data block, as discussed in FIG. 3B. In the illustrated embodiments, the first frame 320-1 and the second frame 320-2 each comprises a reference block 322-1 and 322-2 before the first first data block 302-1a and the third second data block 302-2c, respectively. In some embodiments, when a change in channel status, e.g., reduced multipath delay, is detected within the first frame 320-1, a change in the dummy sequence can be implemented in the same frame, e.g., the first frame 320-2 after the fourth first data block 302-1d.

Figure 4:
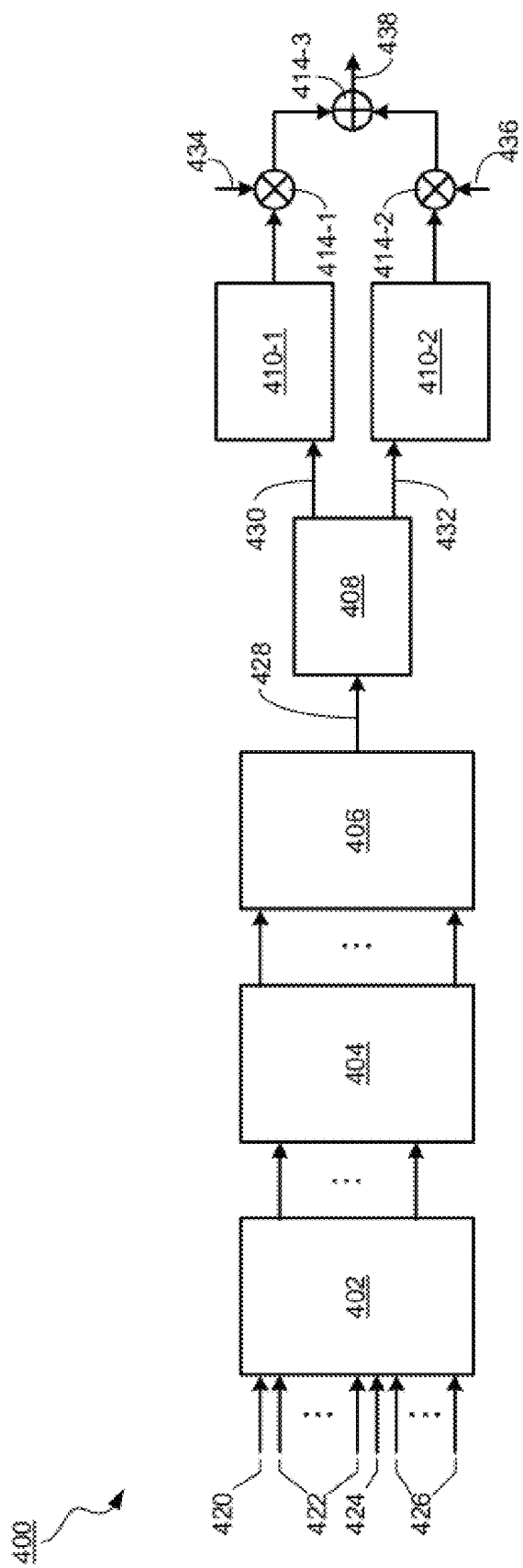
FIG. 4 illustrates a schematic of a data modulation system for data preparation, in accordance with some embodiments of the present disclosure.

FIG. 4 illustrates a schematic of a data modulation system 400 for data preparation, in accordance with some embodiments of the present disclosure. In some embodiments, the data modulation system 400 comprises a discrete Fourier transform (DFT) unit 402, a subcarrier mapping unit 404, an inverse fast Fourier transform (IFFT) unit 406, a real-imaginary part splitting unit 408, a first pulse-shaping and digital-to-analog converting unit 410, a first mixing module 414-1, a second mixing module 414-2, and an adding module 414-3. In the illustrated embodiments, the DFT unit 402 receives a first dummy sequence 306 at inputs 426, a sequence 310 at input 424, a data sequence (e.g., a first data sequence 304-1 or a second data sequence 304-2) at inputs 422, and a third dummy sequence 312 at input 420. In some embodiments, the DFT unit 402 comprises M inputs, wherein M is the length of a data block, e.g., a first data block 302-1 or a second data block 302-2. In some embodiments, the IFFT unit 406 comprises N inputs, wherein N is an integer and N is greater than M due to oversampling at the subcarrier mapping unit 404.

In the illustrated embodiments, a second data block 302-2 comprising a third dummy sequence 312, a second data sequence 304-2, a sequence 310 and a first dummy sequence 306 in the time domain is provided at the input of the real-imaginary part splitting unit 408. In the illustrated embodiment, the real part 430 of the output of the real-imaginary part splitting unit 408 is then provided at the first mixing module 414-1 to form radio frequency signal with input 434. Similarly, the imaginary part 432 of the output of the real-imaginary part splitting unit 408 is then provided at the second mixing module 414-2 to form radio frequency signal with input 436. In the illustrated embodiment, outputs of the mixing module 414-1 and the mixing module 414-2 are then provided to inputs of the adding module 414-3 to provide output 438.

Figure 5:
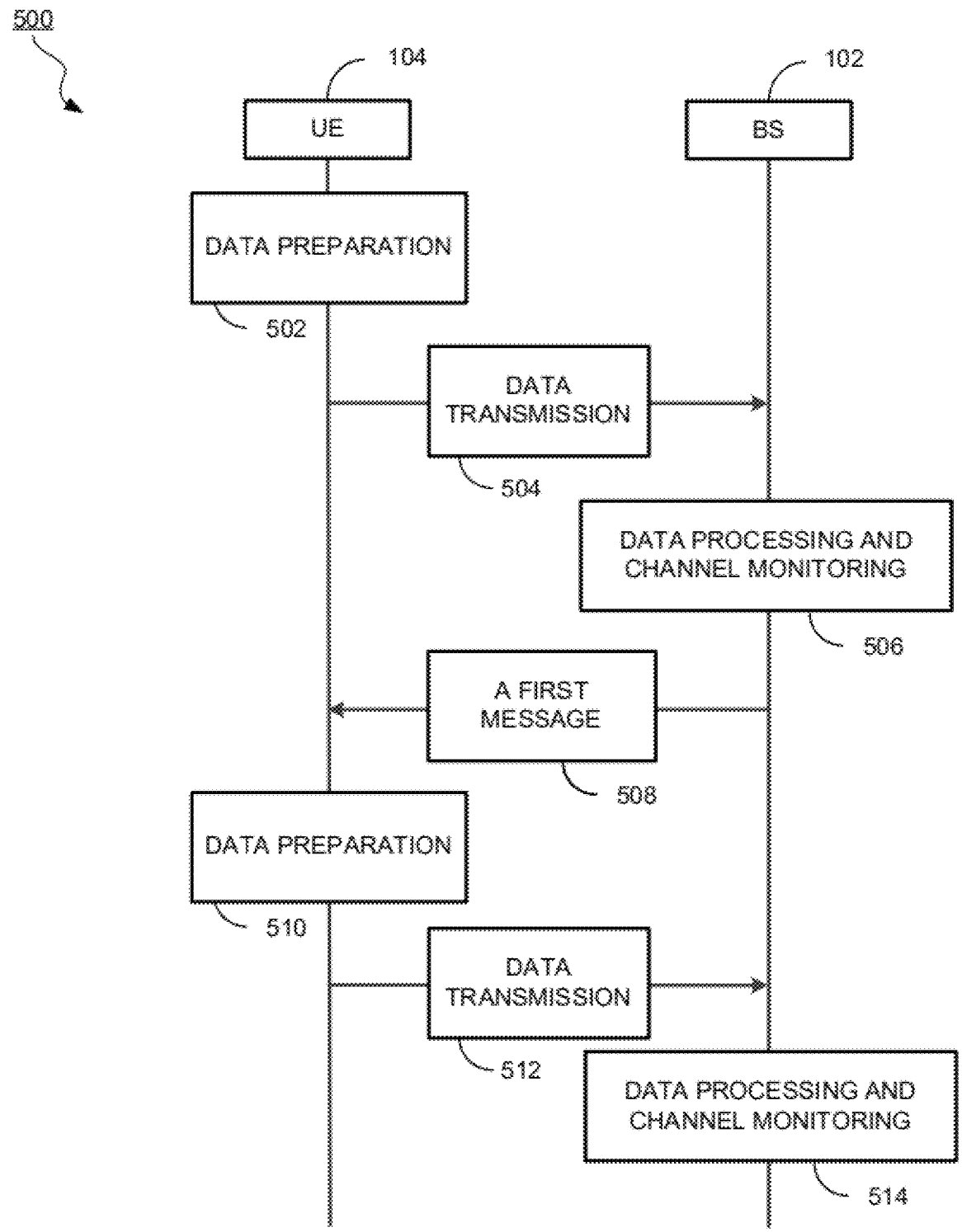
FIG. 5 illustrates a method for inserting dummy sequences during data modulation in a wireless communication system, in accordance with some embodiments of the present disclosure.

FIG. 5 illustrates a method 500 for inserting dummy sequences during data modulation in a wireless communication system, in accordance with some embodiments of the present disclosure. It is understood that additional operations may be provided before, during, and after the method 500 of FIG. 5, and that some operations may be omitted or reordered. The communication system in the illustrated embodiment comprises a BS 102 and a UE 104. In the illustrated embodiments, a UE 104 is in one of at least one serving cell covered by the BS 102, i.e., the UE 104 is in connection with the BS 102. In some embodiments, the BS 102 is a wireless access point or a wireless communication node. In some other embodiments, the UE 104 is a wireless station or a wireless communication device. It should be noted that any numbers of BS 102 or UE 104 can be used and are within the scope of this invention.

The method 500 starts with operation 502 in which uplink (UL) data is prepared by the UE 104 according to some embodiments. In some embodiments, a data preparation performed by the UE 104 prior to a transmission of the UL data to the BS 102 comprises at least one of the following processes, dividing the UL data into a plurality of first data sequences with a first length, inserting at least one dummy sequence to the plurality of first data sequences, performing a discrete Fourier transform (DFT), performing a subcarrier mapping in the frequency domain, inserting at least one guard subcarrier, performing an inverse fast Fourier transform (IFFT), filtering a plurality of first blocks, and digital-to-analog converting the plurality of first blocks which are then transmitted through transmitting antennas of the UE 104 to receiving antennas of the BS 102. In some embodiments, the at least one dummy sequence is inserted for at least one reason including but not limited to: Cyclic Prefix, assisted phase tracing, assisted channel estimation, and synchronization. The preparation performed by the UE 104 is also discussed in detail in FIG. 4.

The method 500 continues with operation 504 in which the plurality of first blocks is transmitted from the UE 104 to the BS 102 according to some embodiments. In some embodiments, each of the plurality of first blocks comprises at least one of the following: a plurality of first data blocks, at least one reference signal block, and at least one synchronization block. In some embodiments, each of the plurality of first data blocks comprises a first data sequence and a first dummy sequence.

In some embodiments, the first dummy sequence is selected by the UE 104 from a dummy sequence set. In some embodiments, the dummy sequence set comprises a plurality of dummy sequences. In some embodiments, the dummy sequence set is pre-determined by the system. In some embodiments, each of the plurality of dummy sequences comprises M elements, i.e., a length of the dummy sequence M, wherein M is a positive integer and M is less than a length of a block. In some embodiments, each of the M elements is a complex number with a constant modulus value. In some embodiments, the dummy sequence set comprises at least one base sequence and each of the dummy sequences in the dummy sequence set comprises at least one base sequence, i.e., each of the plurality of dummy sequences is a combination of at least one base sequence. In some embodiments, the at least one base sequence has a same number of elements. In some embodiments, each of the plurality of dummy sequences in the dummy sequence set has a sequence index number. In some other embodiments, the first dummy sequence is cut out from one of the following: a Zadoff-Chu (ZC) sequence, a Golay Complementary sequence, and a Maximum-length (M) sequence.

The method 500 continues with operation 506 in which the plurality of first blocks is processed and channel is monitored by the BS 102 according to some embodiments. In some embodiments, processing to the plurality of first blocks comprises at least one of the following: performing DFT transform on the plurality of first data blocks to the frequency domain, performing frequency domain equalization, transforming into the time domain using IFFT, removing the at least one reference block, and performing decoding and demodulation. In some embodiments, monitoring of the channel in order to obtain a channel status is performed according to the at least one reference block in the plurality of first blocks.

The method 500 continues with operation 508 in which a first message is transmitted from the BS 102 to the UE 104 according to some embodiments. In some embodiments, the first message comprises a dummy sequence index of a second dummy sequence in the dummy sequence set determined by the BS 102 according to the at least one reference block received from the UE 104. In some embodiments, the first message is transmitted through a physical downlink control channel (PDCCH). In some other embodiments, the first message is transmitted in a radio resource control (RRC) message.

The method 500 continues with operation 510 in which the UL data is further prepared by the UE 104 according to some embodiments. In some embodiments, the second dummy sequence is determined according to the dummy sequence index received in the first message. In some embodiments, a data preparation performed by the UE 104 prior to a transmission of the UL data to the UE 104 comprises at least one of the following processes, dividing the DL data into a plurality of second data sequences with a second length, inserting at least one dummy sequence to the plurality of second data sequences, performing a discrete Fourier transform (DFT), performing a subcarrier mapping in the frequency domain, inserting at least one guard subcarrier, performing an inverse fast Fourier transform (IFFT), filtering a plurality of second blocks, and digital-to-analog converting the plurality of second blocks which are then transmitted through transmitting antennas of the UE 104 to receiving antennas of the BS 102. In some embodiments, each of the plurality of second blocks comprises at least one of the following: a plurality of second data blocks, at least one reference block, and at least one synchronization block. In some embodiments, each of the plurality of second data blocks comprises a second data sequence and the second dummy sequence.

The method 500 continues with operation 512 in which the plurality of second blocks is transmitted from the UE 104 to the BS 102 according to some embodiments.

The method 500 continues with operation 514 in which the plurality of second blocks is processed and channel is monitored by the BS 102 according to some embodiments. In some embodiments, processing to the plurality of second blocks comprises at least one of the following: performing DFT transform on the plurality of second data blocks to the frequency domain, performing frequency domain equalization, transforming into the time domain using IFFT, removing the at least one reference block, and performing decoding and demodulation. In some embodiments, monitoring of the channel in order to obtain a channel status is performed according to the at least one reference block in the plurality of second blocks.

It should be noted that there can be more than one UE 104, i.e., a plurality of UEs in the serving cell of the BS 102. In this case, frequency-division multiplexing can be used to transmit UL data from each of the plurality of UEs to the BS 102 through different data blocks 302. Different data blocks 302 for different UEs may comprises at least one dummy sequence that is determined according to the channel status of between each of the plurality of UEs and the BS 102, e.g., different dummy sequences for different UEs with different channel status. When there are changes in the channel status (e.g., multipath delay), the BS 102 may change the dummy sequences for different UEs.

While various embodiments of the invention have been described above, it should be understood that they have been presented by way of example only, and not by way of limitation. Likewise, the various diagrams may depict an example architectural or configuration, which are provided to enable persons of ordinary skill in the art to understand example features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method for data modulation by a wireless communication node of a wireless communication system, comprising:
    inserting at least one first dummy sequence to a first data sequence in a first data block; and
    inserting at least one second dummy sequence to a second data sequence in a second data block;
    wherein a first length of a first dummy sequence is different from a second length of a second dummy sequence, and wherein the second dummy sequence includes the first dummy sequence or is included in the first dummy sequence,
    wherein a third length of the first data block equals to a fourth length of the second data block, and
    wherein when the second dummy sequence includes the first dummy sequence, the first dummy sequence is configured at the end of the second dummy sequence, and wherein when the second dummy sequence is included in the first dummy sequence, the second dummy sequence is configured at the end of the first dummy sequence.

2. The method of claim 1, wherein:
    the at least one first dummy sequence and the at least one second dummy sequence are selected from a dummy sequence set, wherein the dummy sequence set comprises a plurality of dummy sequences.

3. The method of claim 2, wherein the dummy sequence set is predetermined by the wireless communication system.

4. The method of claim 2, wherein each of the plurality of dummy sequences comprises M elements, wherein each of the M elements is a complex number with a constant modulus value, or
    each of the plurality of dummy sequences in the dummy sequence set is one of: cut out from a Zadoff-Chu (ZC) sequence, cut out from a Golay Complementary sequence, cut out from a Maximum-length (M) sequence, or modulated by a Pi/2 Binary Phase Shift Keying (BPSK) modulation.

5. The method of claim 1, wherein the first data block is one of: adjacent to the second data block, or separated from the second data block by at least one of: a reference signal block or a synchronization signal block.

6. The method of claim 1, wherein the first data block is configured in a first subframe and the second data block is configured in a second subframe.

7. The method of claim 1, further comprising:
    prior to the inserting at least one second dummy sequence,
        receiving a first message from a wireless communication device;
        determining the at least one second dummy sequence according to the first message; and
    after the inserting at least one second dummy sequence,
        performing a data modulation process; and
        transmitting information of the at least one second dummy sequence to a wireless communication device,
    wherein the first message comprises information of link status, wherein the first message is received in one of the following: a physical uplink control channel (PUCCH) and a radio resource control (RRC) message, and wherein the data modulation process comprises at least one of: discrete Fourier transform (DFT), subcarrier mapping, inverse fast Fourier transform (IFFT), real-imaginary part splitting, pulse shaping, digital-to-analog converting, or signal mixing.

8. A computing device comprising at least one processor and a memory coupled to the processor, the at least one processor configured to carry out the method of claim 1.

9. A method for data modulation by a wireless communication device of a wireless communication system, comprising:

receiving a first data block from a wireless communication node, wherein the first data block comprises at least one first dummy sequence and a first data sequence; and receiving a second data block from the wireless communication node, wherein the second data block comprises at least one second dummy sequence and a second data sequence;

wherein a first length of a first dummy sequence is different from a second length of a second dummy sequence, and wherein the second dummy sequence includes the first dummy sequence or is included in the first dummy sequence, wherein a third length of the first data block equals to a fourth length of the second data block, and wherein when the second dummy sequence includes the first dummy sequence, the first dummy sequence is configured at the end of the second dummy sequence, and wherein when the second dummy sequence is included in the first dummy sequence, the second dummy sequence is configured at the end of the first dummy sequence.

10. The method of claim 9, wherein:

the at least one first dummy sequence and the at least one second dummy sequence are selected from a dummy sequence set, wherein the dummy sequence set comprises a plurality of dummy sequences.

11. The method of claim 10, wherein the dummy sequence set is predetermined by the wireless communication system.

12. The method of claim 10, wherein each of the plurality of dummy sequences comprises M elements, wherein each of the M elements is a complex number with a constant modulus value, or wherein each of the plurality of dummy sequences in the dummy sequence set is one of: cut out from a Zadoff-Chu (ZC) sequence, cut out from a Golay Complementary sequence, cut out from a Maximum-length (M) sequence, or modulated by a Pi/2 Binary Phase Shift Keying (BPSK) modulation.

13. The method of claim 9, wherein the first data block is one of the following: adjacent to the second data block and separated from the second data block by at least one of: a reference signal block or a synchronization signal block.

14. The method of claim 9, wherein the first data block is configured in a first subframe and the second data block is configured in a second subframe.

15. The method of claim 9, further comprising:

after the receiving a first data block, transmitting a first message to the wireless communication node; and before the receiving a second data block, receiving information of the at least one second dummy sequence from the wireless communication node, wherein the first message comprises information of link status, wherein the first message is transmitted in one of: a physical uplink control channel (PUCCH) or a radio resource control (RRC) message, and wherein the information of link status is used for determining the at least one second dummy sequence by the wireless communication node.

\* \* \* \* \*